Oct. 8, 1940.                C. GROSS                2,216,836

ROTATING SLEEVE VALVE FOR COMBUSTION MOTORS

Filed July 5, 1939

Inventor:
Count Gross

Patented Oct. 8, 1940

2,216,836

UNITED STATES PATENT OFFICE 2,216,836

ROTATING SLEEVE VALVE FOR COMBUSTION MOTORS

Court Gross, Oslo, Norway, assignor to Motoraktieselskapet Av 1935, Oslo, Norway Application July 5, 1939, Serial No. 282,931
In Norway July 7, 1938

1 Claim. (Cl. 123—190)

There is known for instance from British Patent No. 437,781 valve arrangements for motors comprising a tubular sleeve rotating in the space between a cylindric valve housing, the axis of which is perpendicular or approximately perpendicular to the cylinder axis and a cooled stationary core located in the valve housing co-axially with the latter.

The present invention relates to valve devices of this kind and particularly has for its object an embodiment in which no cooling liquid is required for the stationary interior core in the cylindric valve housing, said core in accordance with the present invention being partly cooled by radiation of heat from its exterior surface and partly by means of the mixture of air and combustible conducted to the cylinder of the motor whereby the core also serves the purpose of effectively heating the said mixture.

In accordance with the invention a stationary core in the cylindric valve housing is provided with an axial bore extending from one end of the core approximately to midway between the ends thereof, said bore being at its inner end connected with a side opening in the core. Through this axial bore the supply of air and combustible is conducted, the passage from the said side opening to the intake opening of the cylinder being controlled in a manner known per se by means of the rotating sleeve valve.

The rest of the core is made solid and is provided in a known manner with an exterior depression or channel, through which the exhaust gases are conducted from the cylinder to the exhaust tube also controlled by the rotating sleeve valve. The solid part of the core extends to the exterior surface of the cylinder head where it is provided with cooling ribs exposed to the surrounding air.

Experiments have proved that it is possible in this manner to obtain an efficient cooling of the core particularly when the same is made of a metal with good heat conductance such as for instance an aluminum copper alloy with about 15% aluminum.

Figure 1:
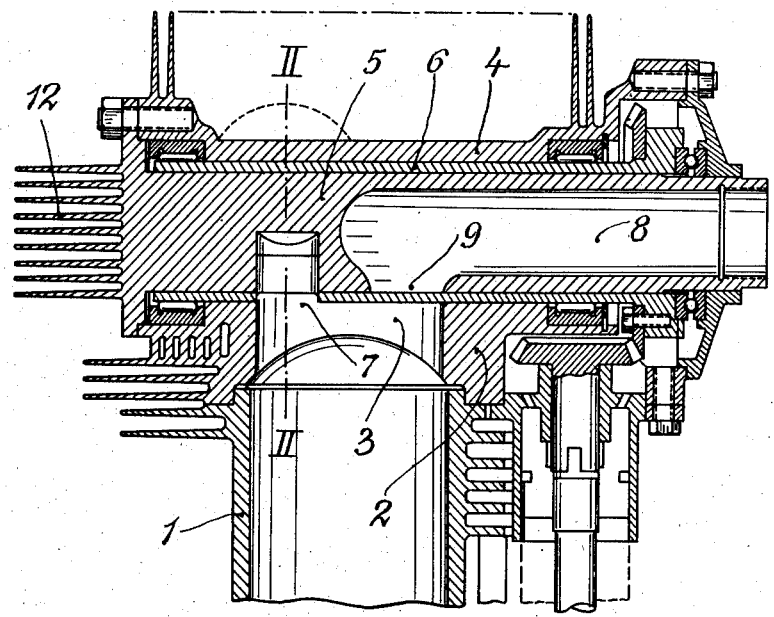
Figure 2:
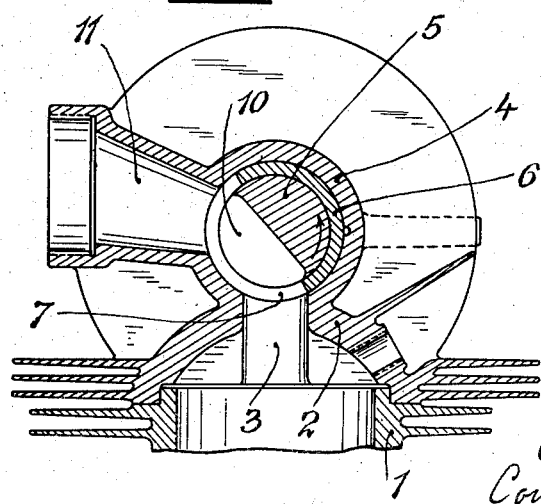

On the drawing there is diagrammatically illustrated a form of the invention, Fig. 1 showing an axial section through the cylinder and valve whereas Fig. 2 is a section of the cylinder head and the valve on the line II—II of Fig. 1.

1 is the cylinder and 2 the cylinder head which is provided with a transverse channel 3, serving for outlet as well as for inlet purposes although this channel may also be divided in two parts by means of a transverse wall. 4 is the cylindric valve housing and 5 the stationary cylindric core which is co-axial with the valve housing. 6 is the rotating tubular sleeve valve which is provided in a known manner with openings which during the rotation of the sleeve valve register in correct order with channel 3. Opening 7 for the outlet is illustrated on Figs. 1 and 2 of the drawing.

Core 5 has an axial bore from one of its ends so as to form a channel 8 through which the fuel air mixture is conducted to the cylinder, and this channel 8 at its inner end has a side opening 9 which is made to communicate in a known manner with channel 3 by means of a side opening in the rotating sleeve valve.

The remaining solid part of core 5 is provided in a known manner with an exterior depression or channel 10 forming the connection with channel 3 and outlet channel 11 when the outlet opening 7 of the rotating sleeve valve is in the position illustrated on Fig. 2.

The cooling of the solid part of the core is effected by radiation of heat from the exterior cooling ribs 12.

Instead of introducing the air and fuel mixture from the end of the core opposite to the cooling ribs 12, it may also be introduced through a channel from the end of the core carrying the cooling ribs, the intake channel being then carried past the exterior channel 10 of the core.

Having now particularly described and ascertained the nature of my said invention, and in what manner the same is to be performed, I declare that what I claim is:

A rotating sleeve valve arrangement for combustion motors of the kind which is provided with a cylindrical valve housing the axis of which is transverse to the power cylinder axis, and having in its interior a stationary cylindrical body, the exterior surface of which is concentric with the interior surface of the cylindrical valve housing, and also having a rotating tubular sleeve valve with side openings placed in the space between the inner surface of the cylindrical valve housing and the interior stationary cylindrical body, the supply of fuel air mixture to the power cylinder taking place through an axial channel in the interior stationary cylindrical body, said channel having at its inner end a side opening the communication between which and the power cylinder is controlled by means of the rotating sleeve valve, whereas the outlet from the power cylinder takes place through an exterior depression or channel in the cylindrical body, characterized in this that the said stationary cylindrical body is solid, and besides being cooled by the fuel air mixture supplied to the cylinder, is provided with cooling ribs at one end of the body exposed to the outside air, for cooling the body by conductance of heat.

COURT GROSS.